(12) United States Patent
Kulesza et al.

(10) Patent No.: US 7,756,838 B2
(45) Date of Patent: Jul. 13, 2010

(54) ROBUST END-OF-LOG PROCESSING

(75) Inventors: Jakub Kulesza, Bellevue, WA (US);
Steven J. Lindell, Bellevue, WA (US);
Jeffrey A. East, Sammamish, WA (US);
Luis Felipe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 11/301,168

(22) Filed: Dec. 12, 2005

(65) Prior Publication Data

US 2007/0136380 A1    Jun. 14, 2007

(51) Int. Cl.
*G06F 17/00*    (2006.01)
(52) U.S. Cl. ...................................... 707/682
(58) Field of Classification Search ................... 707/200
See application file for complete search history.

(56) References Cited

U.S. PATENT DOCUMENTS

| | | | | |
|---|---|---|---|---|
| 5,278,982 A | * | 1/1994 | Daniels et al. .............. 707/202 |
| 5,418,940 A | * | 5/1995 | Mohan ........................... 714/5 |
| 5,437,026 A | * | 7/1995 | Borman et al. .............. 707/202 |
| 5,659,774 A | * | 8/1997 | Saito et al. ................. 358/1.18 |
| 5,966,706 A | * | 10/1999 | Biliris et al. .................. 707/10 |
| 7,177,993 B1 | * | 2/2007 | Kiselev et al. .............. 711/162 |
| 7,415,488 B1 | * | 8/2008 | Muth et al. ................. 707/202 |
| 2004/0215998 A1 | * | 10/2004 | Buxton et al. .................. 714/2 |
| 2005/0055559 A1 | * | 3/2005 | Bucher ....................... 713/188 |

* cited by examiner

*Primary Examiner*—Neveen Abel Jalil
*Assistant Examiner*—Kellye D Buckingham
(74) *Attorney, Agent, or Firm*—Woodcock Washburn LLP

(57) ABSTRACT

A method of invalidating an unused log file in a database includes examining a discard log information storage area and determining if a discard log exists. If the discard log exists, the log is invalidated. The headers of each of the log files that have been fully invalidated are then invalidated. The discard log is then fully invalidated and a new log file may be generated on top of the discarded log. The method may be interrupted by a failure, a changeover, or crash and will be repeated until it completes.

19 Claims, 4 Drawing Sheets ized ahead of the commit are contained in a logical discard log file. The logical discard log file is essentially the regions of the log that are unusable. The logical discard log file is virtualized in a storage area and does not necessarily correspond to any physical log file.

ROBUST END-OF-LOG PROCESSING

BACKGROUND

Determining the end-of-log is a condition necessary to correctly perform the recovery of a database. Normally, database management system preserves state in checkpoints that establish the point in the transaction log from where the recovery processing must begin. But, the end of the log is determined by reading the log itself. Traditional methods for finding the end-of-log are based on two premises. First, there is a capability in most database management systems to discover that a log record is not well-formed. This not-well formed log detection marks the last complete log record. The last well-formed log records is deemed the end-of-log. Second, there is a maximum size of I/O operations that the database can expect. So, by formatting the tail of the log using this maximum I/O size in a manner that invalidates the log buffers, the system is assured of being able to find an invalid log buffer should a new crash occur and the need to find the end-of-log arise.

In mirroring systems, the mirror is processing the log being sent to it by the principal. In addition, the principal and the mirror establish and update the "end of log of interest". For example, the mirror can tell the principal how far in the log it has committed to disk and vice versa. Given the intercommunication technologies available and the processing of shipping buffers containing log records, it is possible for the mirror to be ahead of the principal in committing the log.

When transactional consistency is desired between the principal and the mirror, there is additional coordination of log hardening (saving to disk) that occurs. In particular, before declaring that a transaction has committed, the principal has to receive from the mirror that it has hardened the log through the records for the transaction being committed. Long-running transactions produce many log records before they commit. The processing of transactional statements that manage bulk data produces large volumes of log records before the transaction commits. Thus, the mirror can have an arbitrary large amount of log records that are beyond what would be useful in case of a crash and failover. So, in case of mirroring, when the system fails over to the mirror, the log may contain an arbitrary log of records that are not of interest.

FIG. 1 depicts a principal log 10 and a mirror log 20 at a time of failover. The principal log 10 contains committed data 30 and transactional log data 40. The mirror log naturally contains the same committed data 30a and some uncommitted transactional log data sent to the mirror from the principal log 10. The mirror 20 steadily commits data as it is sent from the principal as described above. At a failover from the primary log 10 to the mirror log 20, a last committed transaction 55 in the mirror becomes the point at which the mirror can accept new transactions. However, there exists uncommitted transactions 40 in the principal that need to be discarded in an organized manner if the principal is to act as a backup for the mirror database.

For purposes of example, assume a mirroring database scenario with a principal sending log records to the mirror. Here, the principal is allowed to operate in a mode where the mirror is trailing on a best-effort manner to accept transactions and commit them. In this mode there is no guarantee that the mirror is processing the log at a point, a logical sequence number (LSN), which is close to where the principal is processing. In other words, the LSN of the log record being processed by the mirror can be much smaller than the LSN of the last log record being produced by the principal. In one example, the mirror may be offline for a period of time and then reconnect. Thus the processing of log records between the principal and mirror can vary widely. Throughout this period the principal continues operating undisturbed. It should be clear that in this style of circumstance the amount of log records at the principal may be substantially longer than those at the mirror. Even when full transactional consistency is required between the mirror and the server, a long running transaction may also provoke this same circumstance of log records.

In one embodiment, a "forced failover" may be initiated. In such a forced failover the principal fails and the mirror database becomes the principal, even though the mirror can be way behind in processing the transaction log. When such a request arrives in a principal (System P) having a log arbitrarily larger than the log present in the mirror (System M), data loss may occur. But, from the perspective of the database, the only challenge is to provide the required internal consistency that is expected. At the mirror database one may apply the traditional method to find the end-of-log to complete recovery and accept new transactions. System M can do this using the traditional methods.

Some time later, system P reconnects to system M. System P starts acting as the mirror and must detect how far ahead of the old mirror it was, undo the changes falling in that time range, and then beginning synching the log to catch up with the old mirror/new principal, system M. The system M will have started serving the database as of some point specified by a LSN, LSN-Fail. The system P will know that it was in-step with the mirror up to some LSN, LSN-PLow, up to which it can trust the log as being identical to system M's log. This LSN will be less than or equal to LSN-Fail. The system P will also detect the end of its log by traditional scanning, the end of log being some LSN, LSN-PHigh. The log range between LSN-PLow and LSN-PHigh is subject to the aforementioned undo and subsequently must be discarded. This discard is where problems with the traditional method arise.

If system P were to begin receiving log blocks from system M and simply overlaying the existing discarded log, the log would not be scanable via the traditional method as the end would not be detectable. In one instance, the log would potentially look corrupt, or to complicate things further, through lucky block alignment, the log might be scanable yet not internally consistent. Thus, a problem exists in properly dealing with unusable log records.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one aspect of the invention, an unusable transaction log file, called a logical discard log file, may be invalidated in a database. The invalidation of the discard log begins after the existence of the discard log is verified by reading information in a storage area. The discard log is data pattern invalidated, one log block at a time, until the complete discard log file is invalidated. Headers for completely invalidated log blocks are then also invalidated. The storage area information is then reset to no longer indicate that a discard log exists. New log transactions can then be processed.

In another aspect of the invention, the above method is modified so that only the first log record is invalidated. Then, new log transactions may be processed. This allows the database to come on-line faster. The remaining discard log content is invalidated and the header information invalidated at a later time asynchronous from the current processing operations.

DETAILED DESCRIPTION OF ILLUSTRATIVE EMBODIMENTS

Exemplary Embodiments

In one aspect of the invention, dealing with the cleanup of a log that has an arbitrary region of log records that are of no interest in a manner that is robust to multiple failures and backup switches is considered. In one approach, the system P described above has to either cleanup the discard log files before receiving new log from system M or process the new log starting from LSN-PLow in a new manner to avoid the potential log malformations as described above.

In one embodiment of the invention, as part of reconnecting system P as a mirror of system M, system P processes the log records in the range LSN-PLow to LSN-PHigh in a manner that the old, discardable log files do not get confused with good, current, log records. A log record is a virtually contiguous portion of a log block including a log record header and optionally a log record body. A log block is a virtually contiguous portion of a logical log file, consisting of a whole number of physical disk blocks and including a block header and one or more log records. A logical log file is a virtually contiguous portion of a physical log file including a logical file header and space for one or more log blocks. Each logical log file is wholly contained within one physical log file. A physical log file is a virtually contiguous file on disk. A physical disk block is the smallest addressable unit of space on a disk volume and is also the unit of atomic input/output. Typically, it is 512 bytes.

Figure 1A:
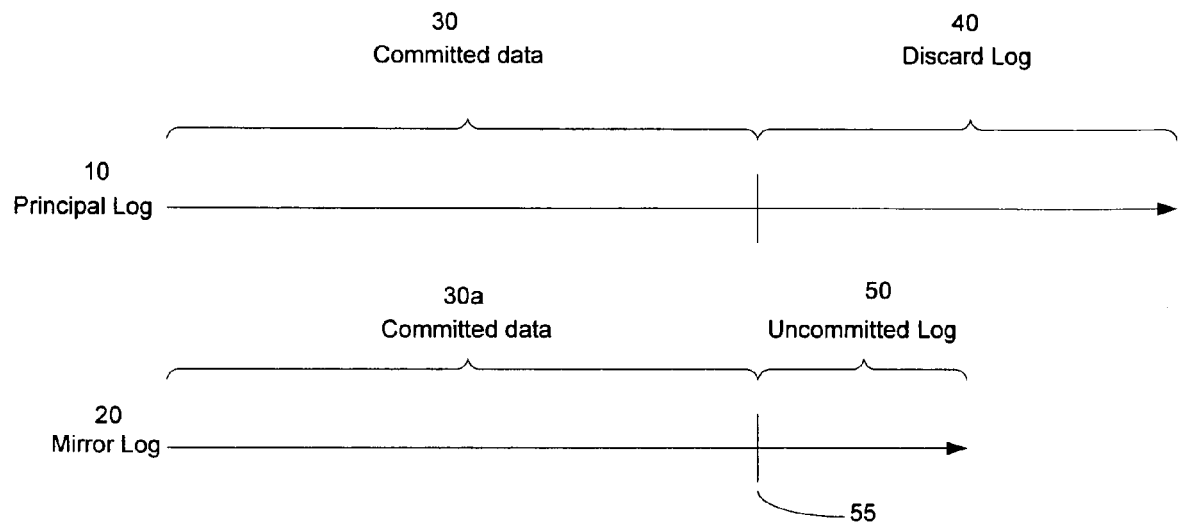
FIG. 1a is a depiction of two discard log files.
Figure 1B:
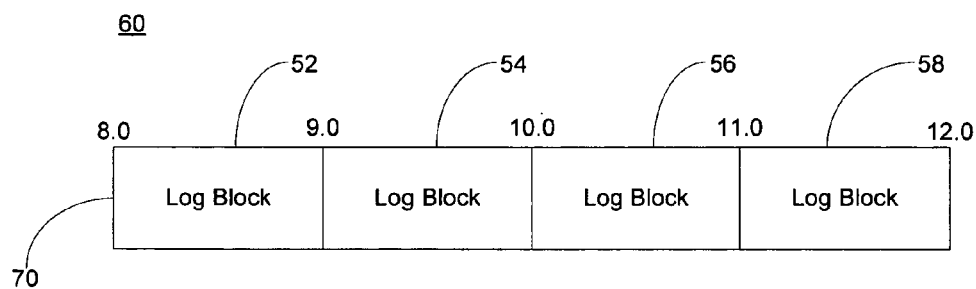
FIG. 1b is a depiction of sequential log blocks in a discard log.

FIG. 1b depicts an example of a logical discard log file 70. The discard log file contains multiple log blocks 52-58. Each log block may be marked with sequence numbers. In the example of FIG. 1b, the beginning of the log file is marked 8.0. The next log block begins at sequence number 9.0, etc. A log-invalidation point or, LSN-PLow, may begin at any incremental point within a log block. For example, the log-invalidation point may be at 8.5. The end of log file may also occur at any point after the log invalidation point. For example, the end of log point, LSN-PHigh, may be at 10.10.

Figure 2:
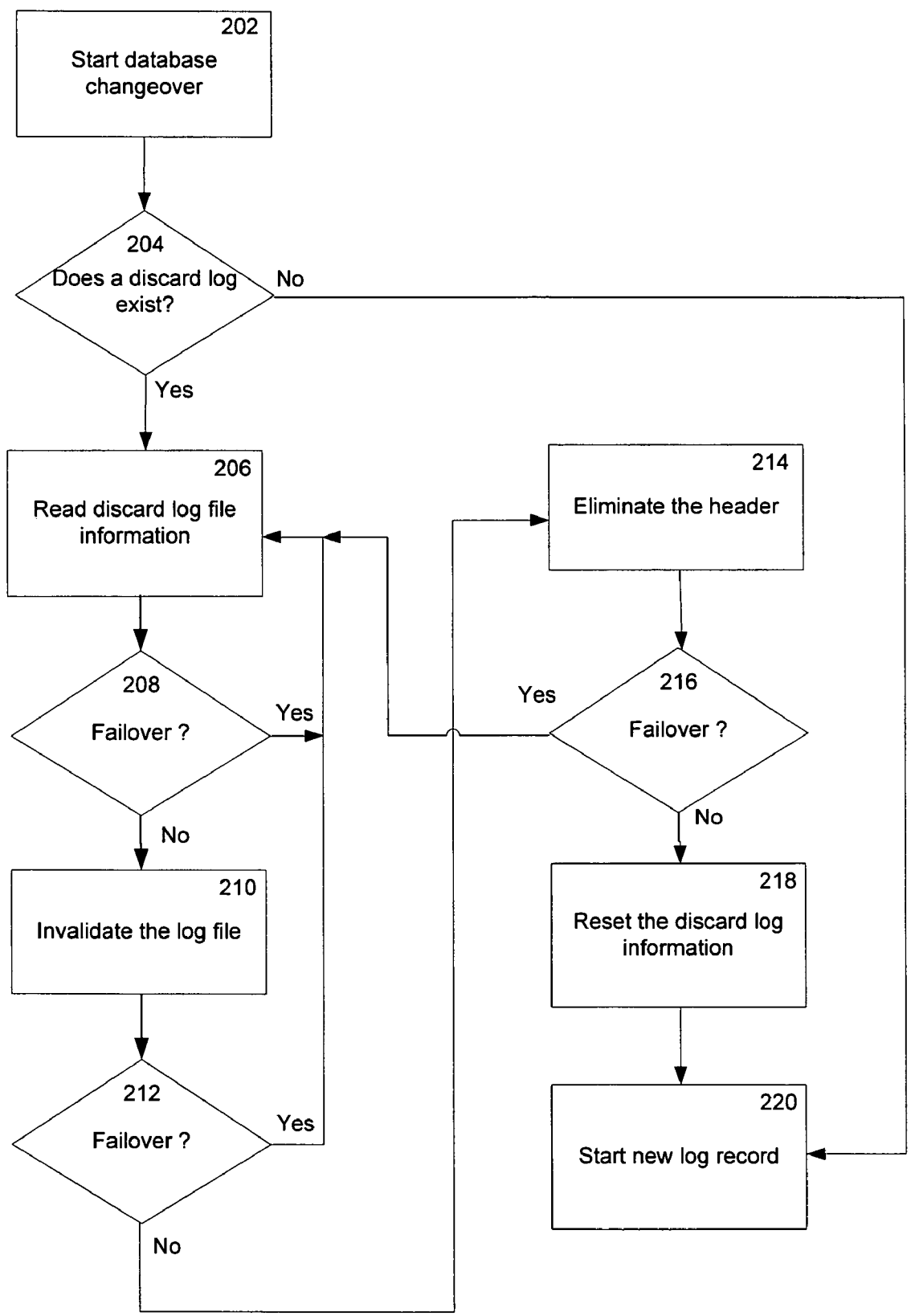
FIG. 2 is an example flow diagram of a method according to aspects of the invention.

FIG. 2 depicts a method 200 that effectively deals with stale log records that are to be discarded in a database. Initially, a changeover from one database to another is initiated (step 202). This step may include a transfer of information from a principal database to the mirror database. The transfer of information includes end of log file information which is the last committed record common to both the primary and mirror databases.

A stable store of database information is checked to determine if a discard log file exists (step 204). In one embodiment, the discard log file contains a flag that a discard log exists, an log-invalidation starting point, an ending point, and a range of log blocks to be invalidated or discarded. The log-invalidation starting point and the ending point are the beginning of the transaction log and the end of the transaction log to be discarded respectively. If a discard log file does not exist, then the database may begin accepting new log records representing database use (step 220). If a discard file does exist, then, the log invalidation starting point is loaded.

In one aspect of the invention, a failover or change in database principal may occur between steps 206 and 218 and the method repeats at step 206 until completion at step 220. If no failovers or changeovers occur, the method 200 runs from step to step without being interrupted for a failover. As a result, the method 200 does not explicitly test for failover, it simply provides that if failovers occur, a mechanism exists for the return of the method to step 206. For example, if a failover occurs after or during the read of the discard log file in step 206, the failover event would cause a return to step 206.

Once step 206 is complete, and no failovers occur (step 208), the discard log file data is replaced with a data pattern that is identifiable as being invalid (step 210). Examples of invalid data patterns are all zeros, all ones, or a fixed combination of zero and ones. Invalidating the discard log file is the writing of a selected invalid data pattern into the discard log file to replace the old discard log file contents. Data pattern invalidation begins at the log-invalidation starting point read from the stable store. The invalidation of the discard log file is performed in physical block order within each logical file from the log-invalidation point (LSN-PLow) to the end of the discard file (LSN-PHigh).

Once step 210 is complete, and no failovers occur (step 212), the headers in the discard log files are eliminated. (step 210). The logical block headers are invalidated within the invalidation range. For example, if the invalidation range is 8.5 to 10.10, then the logical block headers occurring at 9.0 and 10.0 are replaced with an invalid data pattern to completely invalidate the block 9 and 10 without disturbing block 8.0 which is a committed record. In one aspect of the invention, the logical lock headers are invalidated from highest block to lowest block to allow for a recovery if a failover, changeover, or crash occurred.

Once step 214 is complete, and no failovers occur (step 216), the discard log existence information is reset (step 218). Resetting the stable store containing the flag indicating that there is a log discard file to invalidate prevents the method 200 from invalidating any more logs. Thus if a failover, changeover, or crash occurred at this point, then no discard file existence flag would restart the invalidating process. Specifically, if a crash occurred at or after step 218, then decision block 204 would route the method to step 220. Resetting the stable store also clears the log-invalidation starting point and the end of the discard log file to be invalidated.

Once the existence of a discard log file is reset (step 218) then any failover would allow the method 200 to start a new transaction log (step 220). Thus, user transactions records are permitted at this point because the database is synchronized and old transaction logs have been discarded.

Figure 3:
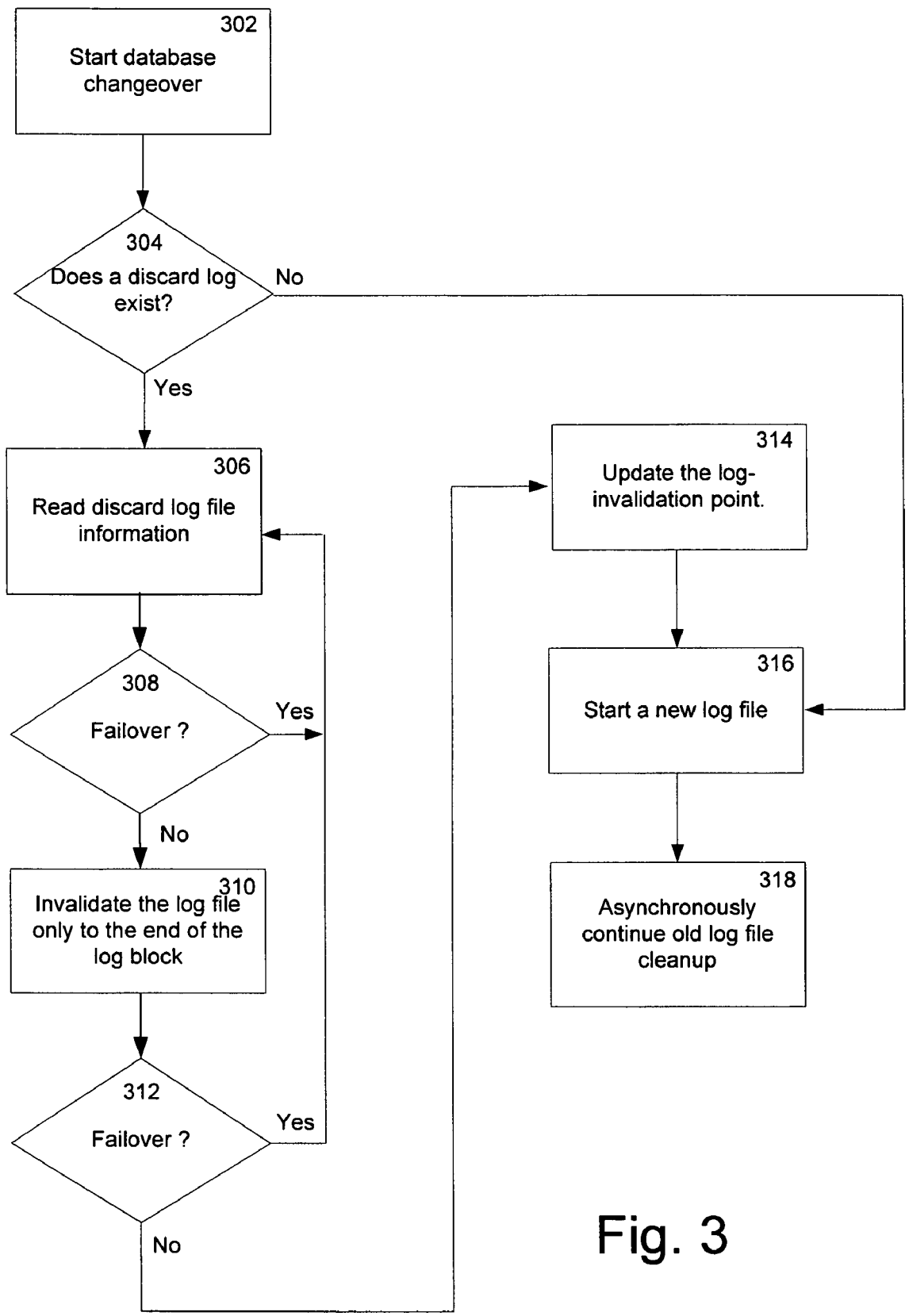
FIG. 3 is an example flow diagram of a method according to aspects of the invention.

Improvements to the method 200 are shown in FIG. 3 which depicts an example method 300. Initially, a changeover from one database to another is initiated (step 302). This step may include a transfer of information from a principal database to the mirror database. This transfer of information could be done by implication, rather than explicit exchange. The transfer of information includes end of log file information which is the last committed record common to both the primary and mirror databases.

A stable store of database information is checked to determine if a discard log file exists (step 304). In one embodiment, the discard log file contains a flag that a discard log exists, an log-invalidation starting point, and a range of logs to be invalidated or discarded. If a discard log file does not exist, then the database may begin accepting new transaction log records representing database use (step 316). If a discard file does exist, then, the log invalidation starting point is loaded.

As in FIG. 2, in one aspect of the invention, a failover or change in database principal may occur between steps 306 and 314 and the method repeats at step 306 until completion at step 314. If no failovers or changeovers occur, the method 300 runs from step to step without being interrupted for a failover. As a result, the method 300 does not explicitly test for failover, it simply provides that if failovers occur, a mechanism exists for the return of the method to step 306.

Once step 306 is complete, and no failovers occur (step 308), the discard log file is invalidated (step 310). Invalidating the discard log file begins at the log-invalidation starting point read from the stable store. The invalidation of the discard log file is performed in physical file order within each logical file from the log-invalidation point (LSN-Plow) to the end of the same logical log file. So, the invalidation of the discard log file is abbreviated as compared to the method 200 of FIG. 1.

Once step 310 is complete, and no failovers occur (step 312), then an update of the log-invalidation starting point in stable storage may occur (step 314). For example, this changes the log invalidation starting point from 8.5 to 9.0. After the update (step 314), a new transaction log may be generated. Thus, the database can begin processing new transaction log files. This method 300 provides faster startup times than the previous method 200.

The rest of the old log invalidation or cleanup may be scheduled by the database management system asynchronously (step 318) from the rest of the log operations. Going forward, the next logical log file in the range of the discarded log would be invalidated, then its header invalidated until the discarded log is fully discarded.

A basic improvement to methods 200 and 300 may occur if the database management system stores in stable storage the values of LSN-PLow and LSN-PHigh and, each time it hardens its log to disk, it updates the lower bound of this range. The system then has, in stable storage, the knowledge of the exact range of log that contains well formed records from a prior epoch. This approach may require additional I/O time each time the log is hardened. Some workloads may not be able to tolerate this additional overhead. However, because of the increased efficiency of detecting uncommitted log records, this approach provides the fastest startup time if combined with methods 200 or 300.

All of the above approaches enable a system, upon recovering from a failure, to determine the range, if any, of the log that is well formed but has records from a prior epoch that are to be ignored or discarded. This knowledge enables determination of the end-of-log for purposes of recovery.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

Figure 4:
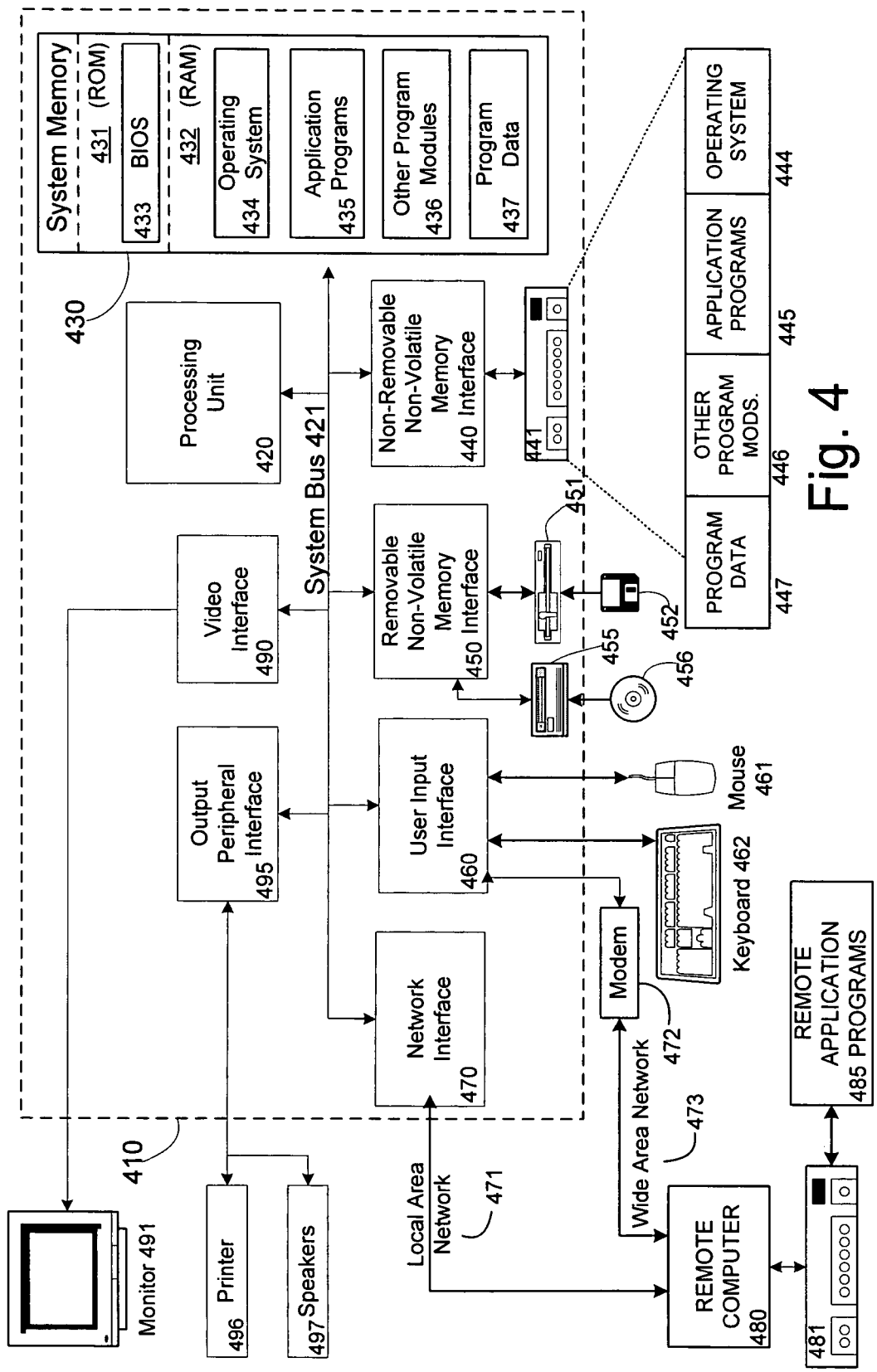
FIG. 4 is a block diagram showing an example computing environment in which aspects of the invention may be implemented.

FIG. 4 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a log file cleanup method. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method for processing database transaction log files, the method comprising:
    invalidating a discard log file of a transaction log of a first database, wherein the discard log file is an unusable transaction log file comprising one or more log blocks of the transaction log having unusable data content that is to be discarded before the first database can begin processing new log records of database transactions received from a second database,
    wherein invalidating the discard log file comprises:
        (a) reading discard log information from a storage area, the discard log information comprising an indicator that the discard log file exists, a starting point identifier of the discard log file, and an ending point identifier of the discard log file, the discard log file comprising at least one log block of the transaction log having unusable data content that is to be discarded;
        (b) replacing the unusable data content of the at least one log block of the discard log file with an identifiably invalid data pattern that makes the log block content of the discard log file identifiable as invalid when scanning the transaction log, said identifiably invalid data pattern comprising a pattern of all zeros, a pattern of all ones or a pattern having a fixed combination of zeros and ones; and invalidating header information of the at least one log block; and
        (c) resetting the discard log information, the reset clearing the indicator that the discard log file exists; and
    overlaying identifiably invalid content of a discarded log block of the discard log file with new log records received from the second database, and
    using existing identifiably invalid content of the discard log file to detect an end of the transaction log, when scanning the transaction log during a recovery process from failure.

2. The method of claim 1, further comprising resuming the method from step (a) if a failover occurs in any of steps (a), (b), and (c).

3. The method of claim 1, wherein replacing the unusable data content of the at least one log block of the transaction log that is to be discarded with an identifiably invalid data pattern comprises writing the identifiably invalid data pattern into the at least one log block in a physical file order within a logical file beginning at a beginning logical sequence number and progressing to an end logical sequence number.

4. The method of claim 1, wherein replacing the unusable data content of the at least one log block of the transaction log that is to be discarded with an identifiably invalid data pattern comprises writing an identifiably invalid data pattern into header information of log blocks that are invalidated.

5. The method of claim 4, wherein header information of a last log block is invalidated before header information of a preceding log block, wherein if a failover occurs, header information is retained in preceding log blocks to allow repeating the invalidating.

6. The method of claim 1, wherein resetting the discard log information further comprises resetting the starting point identifier of the discard log file and the ending point identifier of the discard log file.

7. The method of claim 1, wherein the invalidating is performed in response to initiating a changeover from the first database operating as a principal to the second database operating as a mirror, wherein said changeover causes the second database to operate as the principal and the first database to operate as the mirror.

8. A method for processing database transaction log files, the method comprising:
    invalidating a discard log file of a transaction log of a first database, wherein the discard log file is an unusable transaction log file comprising one or more log blocks of the transaction log having unusable data content that is to be discarded before the first database can begin processing new log records of database transactions received from a second database,
    wherein invalidating the discard log file comprises:
        (a) reading discard log information from a storage area, the discard log information comprising an indicator that the discard log file exists, a starting point identifier of the discard log file, and an ending point identifier of the discard log file, the discard log file comprising at least a first log block of the transaction log having unusable data content that is to be discarded;
        (b) replacing the unusable data content of the first log block of the transaction log that is to be discarded with an identifiably invalid data pattern that makes the log block content of the discard log file identifiable as invalid when scanning the transaction log, said identifiably invalid data pattern comprising a pattern of all zeros, a pattern of all ones or a pattern having a fixed combination of zeros and ones; and invalidating header information of the at least one log block;

(c) updating the starting point identifier of the discard log file to correspond to a next sequential log block having unusable data content following the first log block;

asynchronously invalidating a remaining portion of the discard log file starting with the next sequential log block while the first database is receiving and processing new log records from the second database;

using existing identifiably invalid content of the discard log file to detect an end of the transaction log, when scanning the transaction log during a recovery process from failure.

9. The method of claim 8, wherein the invalidating is performed in response to initiating a changeover from the first database operating as a principal to the second database operating as a mirror, wherein said changeover causes the second database to operate as the principal and the first database to operate as the mirror.

10. The method of claim 8, wherein asynchronously invalidating a remaining portion of the discard log file comprises:

writing an identifiably invalid data pattern into log blocks of the discarded log file; and writing an invalid data pattern into headers of the log blocks of the discarded log files.

11. The method of claim 8, further comprising resetting the discard log information, the reset clearing the indicator that the discard log file exists.

12. The method of claim 8, further comprising resuming the method from step (a) if a failover occurs in any of steps (a), (b), and (c).

13. The method of claim 8, wherein reading discard log information from a storage area further comprises reading a starting point identifier that is past the header of the at least one block.

14. The method of claim 8, wherein replacing the unusable data content comprises writing an identifiably invalid data pattern into the at least one log block in a physical file order within a logical file beginning at a beginning logical sequence number and progressing to an end logical sequence number.

15. A computer-readable storage medium having computer-executable instructions to perform a method for processing database transaction log files, the method comprising:

invalidating a discard log file of a transaction log of a first database, wherein the discard log file is an unusable transaction log file comprising one or more log blocks at the end of the transaction log having unusable data content that is to be discarded before the first database can begin processing new log records of database transactions received from a second database, wherein invalidating the discard log file comprises:
(a) reading discard log information from a storage area, the discard log information comprising an indicator that the discard log file exists, a starting point identifier of the discard log file, and an ending point identifier of the discard log file, the discard log file comprising at least one log block of the transaction log having unusable data content that is to be discarded;

(b) replacing the unusable data content of the at least one log block of the discard log file with an identifiably invalid data pattern that makes the log block content of the discard log file identifiable as invalid when scanning the transaction log, said identifiably invalid data pattern comprising a pattern of all zeros, a pattern of all ones or a pattern having a fixed combination of zeros and ones; and invalidating header information of the at least one log block; and (c) writing a pattern of identifiably invalid data into header information of the at least one log block; and (d) resetting the discard log information, the reset clearing the indicator that the discard log file exists; and overlaying identifiably invalid content of a discarded log block of the discard log file with new log records received from the second database, and using existing identifiably invalid content of the discard log file to detect an end of the transaction log, when scanning the transaction log during a recovery process from failure.

16. The computer-readable storage medium of claim 15, wherein replacing the unusable data content of the at least one log block of the transaction log that is to be discarded with an identifiably invalid data pattern comprises writing an identifiably invalid data pattern into the at least one log block in a physical file order within a logical file beginning at a beginning logical sequence number and progressing to an end logical sequence number.

17. The computer-readable storage medium of claim 15, wherein replacing the unusable data content of the at least one log block of the transaction log that is to be discarded with an identifiably invalid data pattern comprises writing an identifiably invalid data pattern into header information of log blocks that are invalidated.

18. The computer-readable storage medium of claim 17, wherein header information of a last log block is invalidated before header information of a preceding log block, wherein if a failover occurs, header information is retained in preceding log blocks to allow repeating the invalidating.

19. The computer-readable storage medium of claim 15, further comprising computer-executable instructions for resuming the method from step (a) if a failover occurs in any of steps (a), (b), (c), and (d).

* * * * *